May 13, 1969    J. F. STEPHENS    3,444,417
ELECTRIC DISCHARGE DEVICE HAVING A TUBULAR ANODE
LEAD TERMINATING IN A PLURALITY OF SPACED
PROJECTIONS FORMED INTEGRALLY WITH
SAID LEAD AND SECURED TO THE
ANODE BY PERCUSSIVE WELDS
Filed Jan. 12, 1967
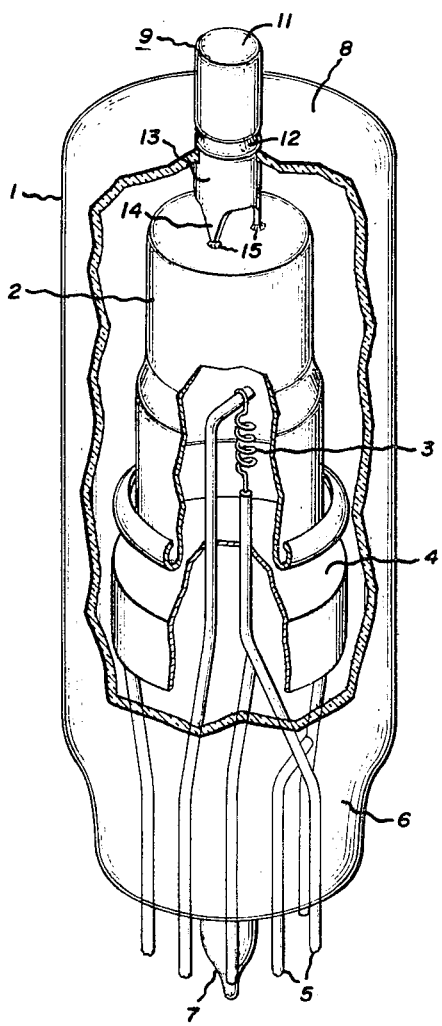
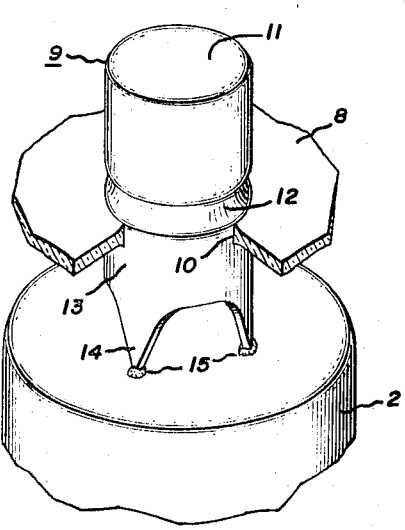
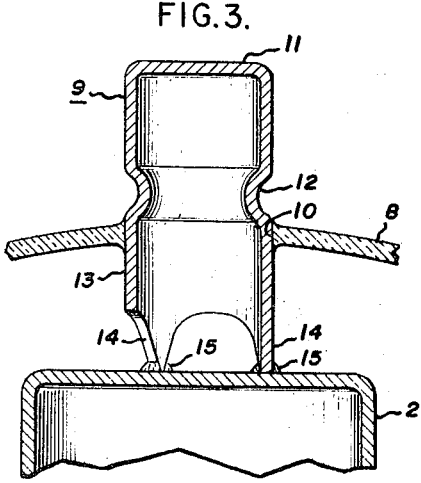
INVENTOR:
JOE F. STEPHENS,
BY *Henry T. Olsen*
HIS ATTORNEY.

3,444,417
ELECTRIC DISCHARGE DEVICE HAVING A TUBULAR ANODE LEAD TERMINATING IN A PLURALITY OF SPACED PROJECTIONS FORMED INTEGRALLY WITH SAID LEAD AND SECURED TO THE ANODE BY PERCUSSIVE WELDS
Joe F. Stephens, Owensboro, Ky., assignor to General Electric Company, a corporation of New York
Filed Jan. 12, 1967, Ser. No. 608,825
Int. Cl. H01j 5/52
U.S. Cl. 313—331                                   1 Claim

ABSTRACT OF THE DISCLOSURE

An electric discharge device, particularly of the rectifier type, having an improved tubular anode lead sealed in the dome of the envelope. The improved lead has a closed end exterior of the envelope and an open end within the envelope. The open end terminates in a plurality of spaced projections, preferably three, which are electrically and mechanically rigidly secured to the anode by percussive welds.

---

This invention relates to electric discharge devices and particularly to a new and improved structure for sealing an electrode lead through insulative portions of the envelopes of such devices.

In some electric discharge devices leads are sealed in both the base thereof and opposite dome portions of the envelopes of the device. Often in this type of structure the lead sealed in the dome portion of the envelope is tubular and cap-like in construction and serves as both a support for an electrode in the envelope and as an external electrical contact for that electrode. Additionally, in order to insure an evacuated condition of the envelope, it is necessary to provide a vacuum tight seal between the lead and the envelope. Some of these seals have been found to be highly sensitive to excessive temperature variations and subject to failure due to thermal shock resulting from sudden or rapid temperature changes, or sudden or rapid applications of excessive heat.

For example, during the usual outgassing and exhaust operations in the manufacture of electric discharge devices of the presently considered type, the electrode supported in the envelope by the above-described type of lead is subjected to relatively high temperatures in order to remove occluded gases from the material thereof. This heating operation has heretofore often resulted in transfer to the lead of substantial quantities of heat which tended to effect excessive expansion of the portion of the lead at the glass-to-metal seal and, thus, effect failure of that seal. Efforts to avoid such seal failure have involved structures wherein the electrode was supported from an internal portion of the lead by means of conductive elements of relatively small cross-section, thus to reduce the heat conductive path from the electrode to that portion of the lead at the seal. This structure, however, did not provide a suitably rigid support for the electrode. In an effort to provide desired rigidity the lead was also constructed with a cylindrical cross-section; and to minimize the heat conductive path between the electrode and the seal in this type of structure the lead was constructed with a plurality of circumferentially arranged apertures as is shown, for example, in U.S. Patent No. 3,080,498—Hammond et al. Another effort to minimize the heat conductive path between the lead and the anode was to interpose a thermal barrier material therebetween as described in U.S. Patent No. 2,931,935—Sloan et al. However, formation of leads with lateral apertures or such interposition of another material has been found to add substantially to the effort and expense of manufacturing the leads.

Accordingly, the primary object of the present invention is to provide a new and improved structure whereby an electrode lead may be sealed in an envelope and whereby operations requiring substantial heating of the electrode may be carried out without deleteriously affecting the seal at the lead.

Another object of the present invention is to provide an electrode support and contact structure which accomplishes a rigid support for the electrode and is adapted for protecting a seal between that structure and an insulative envelope.

Still another object of the present invention is to reduce substantially the manufacturing cost of electrode leads and minimize seal failures during tube manufacture.

Still another object of the invention is to eliminate the need for an interposed layer of material between the anode and the lead.

Further object and advantages of the invention will become apparent as the following description proceeds, and the features of novelty which characterize the invention will be pointed out with particularity in the claims annexed to and forming part of this specification and from the drawing wherein:

FIG. 1 is an enlarged, fragmentary, perspective and somewhat schematic illustration of equipment employable with one form of the invention and of an electric discharge device constructed to include the preferred embodiments of the invention.

FIG. 2 is an enlarged, fragmentary, perspective illustration thereof, and

FIG. 3 is a sectional view of FIG. 2.

Referring to FIG. 1, there is shown a rectifier which embodies the invention and which includes an insulative or glass envelope 1, a tubular anode 2 and a cathode 3 disposed in the anode. The anode is of an inverted cup-like or bell-shaped, flat-bottomed construction with the open end extending downward for receiving the cathode structure.

The cathode structure 3 is supported on a cathode shield 4 which is mounted on leads 5 sealed in and extending through an insulative stem 6 which, in turn, is sealed in the lower end of the bulb portion of the envelope thereby to complete the envelope. Additionally, the stem includes an exhaust tubulation 7 through which evacuation of the envelope is effected.

The anode 2 is supported in the envelope 1 from the upper or dome portion 8 thereof by a thin-walled tubular anode lead or end cap 9, which lead is secured in the envelope by a seal 10. As best seen in FIGS. 2 and 3, the anode lead 9 is of an inverted cup-like structure to provide a closed outer end portion 11. Immediately adjacent the seal 10 in the dome portion 8 of the envelope 1 the anode lead 9 may be provided with a circumferentially extending groove 12 for the purpose of preventing external stresses from rupturing the seal 10, as is more fully disclosed and explained in copending application Ser. No. 447,422 filed Apr. 12, 1965 by C. Maier, and assigned to the same assignee as herein. Thus, the closed outer end portion 11 of the lead 9 extending above the groove 12 forms an end, or top cap for the electrical discharge device by which electrical connection to the anode 2 may be made.

The inner end portion 13 is a longitudinally extending tubular member which is terminated by a plurality of spaced projections 14, said projections 14 preferably being formed by a scalloped end edge, although other shapes may be used. Each of the spaced projections 14 is secured to the top of the anode by means of a percussive weld 15.

Preferably, the scalloped end edge provides three projections 14 spaced 120° from each other about the edge to form a tripodal connection to the anode 2. The three projections 14 may be then readily and rigidly secured to the anode 2 by connecting a source of electrical potential to the anode and the lead and bringing them together, in accordance with known welding techniques, to form the percussive weld 15. With only three projections, the maintenance of closure tolerance dimensions on the length of the projections is substantially eliminated.

Thus, it will be seen that with connection of the lead to the anode at only the small spaced points, the thermal conduction path therebetween is so small as to be practically negligible, yet the mechanical and electrical connection therebetween can be readily produced to form a rigid structure.

What is claimed as new and desired to be secured by Letters Patent of the U.S. is:

1. An electric discharge device comprising an insulative envelope, electrodes within said envelope, a lead for one of said electrodes, said lead including a closed end portion and an open end portion, said closed end portion of said lead extending through the wall of said envelope and sealed directly thereto, said open end portion being formed with spaced projections integral with said open end portion and extending therefrom to form a base on said lead, each said projection terminating in a small point contact, each said point contact being secured to the said electrode by a percussive weld, thereby to provide a minimum thermal conduction path between said electrode and said lead.

References Cited
UNITED STATES PATENTS

| 2,356,112 | 8/1914 | West | 250—27.5 |
| 2,967,229 | 1/1961 | Chuma et al. | 219—119 |
| 2,931,935 | 4/1960 | Sloan et al. | 313—331 |

JOHN W. HUCKERT, *Primary Examiner.*

B. ESTRIN, *Assistant Examiner.*

U.S. Cl. X.R.

313—270, 337, 317